United States Patent [19]

Goldraikh et al.

[11] 4,352,611
[45] Oct. 5, 1982

[54] DOUBLE-ENDED MULTIPLE-SPINDLE FINE BORING MACHINE

[76] Inventors: Genrikh M. Goldraikh, ulitsa Deribasovskaya, 9, kv. 10; Askold F. Dubinenko, ulitsa Kosmonavtov, 13a, kv. 8; Leonid V. Kapitelman, prospekt Dobrovolskogo, 147/1, kv. 33; Viktor A. Krivak, ulitsa 25 Chapaevskoi divizii, 3a, kv. 44; Viktor Y. Livshits, ulitsa Srednefontanskaya, 47/51, kv. 14; Konstantin M. Manenkov, ulitsa Kosmonavtov, 19/1, kv. 24; Semen M. Khomutov, Chernomorskaya doroga, 54b, kv. 29; Eduard N. Khomchenko, ulitsa Ilfa i Petrova, 9, kv. 13, all of Odessa, U.S.S.R.

[21] Appl. No.: 107,912

[22] Filed: Dec. 27, 1979

[51] Int. Cl.³ .............................................. B23B 41/00
[52] U.S. Cl. ...................................... 408/37; 408/39

[58] Field of Search ........................ 408/44, 50, 37, 39

[56] References Cited

U.S. PATENT DOCUMENTS 3,746,459  7/1973  Kindelan ............................... 408/37

Primary Examiner—W. D. Bray
Attorney, Agent, or Firm—Holman & Stern

[57] ABSTRACT

A machine bed carries outer platens and a center platen mounted, for relative movement, on the bearing faces of guides, to effect the feed. The working face of the center platen, whereon a device for clamping the workpieces is mounted, is arranged in a vertical plane. The outer platens extend vertically and carry spindle heads mounted thereon. The bearing faces of the guides are disposed above the center of gravity of each one of the platens mounted thereon for a convenient loading of workpieces and for the removal of cutting fluid and chips by gravity.

9 Claims, 12 Drawing Figures

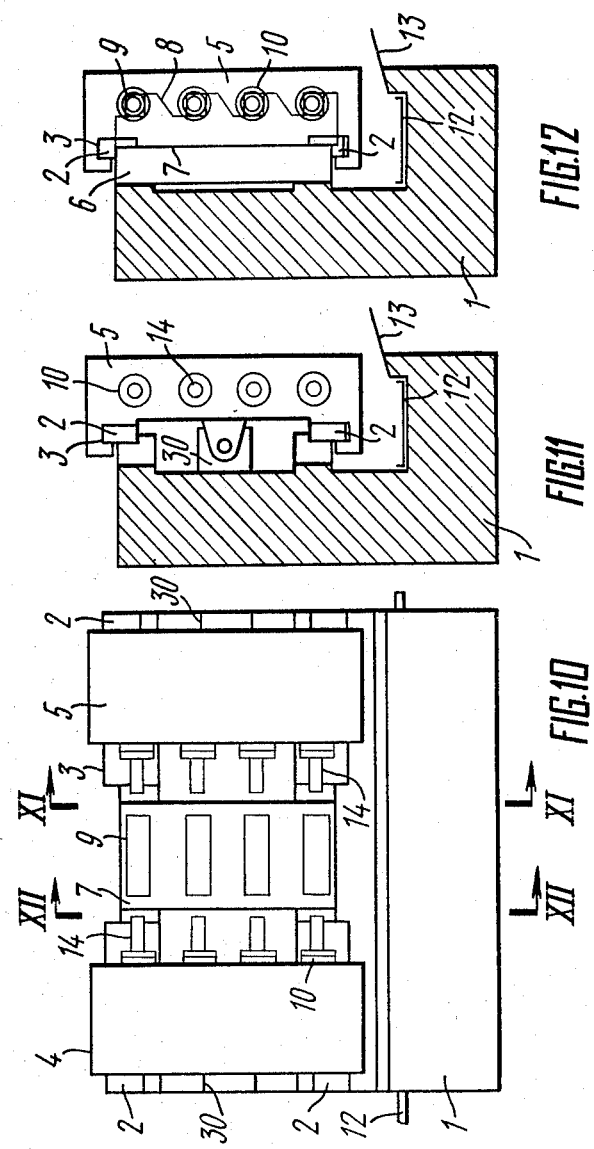

DOUBLE-ENDED MULTIPLE-SPINDLE FINE BORING MACHINE

BACKGROUND OF THE INVENTION

1. Field of Invention

The present invention relates to special-purpose boring machines and, in particular, to double-ended multiple-spindle horizontal-feed fine boring machines.

The invention may be used to the best advantage in large-scale production for fine boring and turning of precision surfaces of workpieces, e.g., of the flange, bushing, and valve fitting types.

2. Prior Art

Double-ended multiple-spindle horizontal-feed fine boring machines are widely known in the art (see, for example, the advertising publication of the EX-CELL-O company, 1974). A double-ended multiple-spindle horizontal-feed fine boring machine normally comprises a bed with outer platens and a centre platen mounted thereon for relative movement on the bearing faces of guides to effect the working feed and rapid motions, a device to receive and clamp the workpieces, mounted on the working face of the centre platen, spindle heads to hold cutting tools therein, mounted on the outer platens in such a manner that the geometrical axes of the spindle heads are parallel to the working face; the outer platens extend horizontally, and said working face of the centre platen is arranged in a horizontal plane. The term "working face" implies here and hereinafter the face of a table or a plate adapted to receive and hold various accessories and workpieces.

The main disadvantage of the above machines lies in that they are not convenient in operation, which is due to the fact that the spindle heads and the positions of the workpiece holding device are arranged horizontally in line. Thus, with more than two spindle heads, it is difficult for the operator to change the tools, set up and clamp the workpieces at the positions remote from him. This, in turn, necessitates the construction of machines with a smaller number of spindle heads, which reduces the number of workpieces which can be handled simultaneously, and consequently lowers the machine efficiency.

Another disadvantage of the prior art machines resides in an accumulation of chips and cutting fluid on the horizontally arranged working face of the centre platen, which necessitates a positive removal of chips and cutting fluid. To this effect, in the prior art machines there are provided chutes arranged at the sides of the centre platen. This, however, causes an increase of the machine width which adds to the difficulties associated with its attendance, and, along with the necessity of chip removal, brings down the machine efficiency. In addition, the difficulties in removing the cutting fluid prevent its supply at a rate required for the use of cutting tools of the most promising materials, such as cubic boron nitride, etc., which further lowers the output.

The shape of the platens and their arrangement in a horizontal plane precludes the possibility of using the prior art machines for multiple machining of workpieces without readjustment of the tools, the workpiece clamping device and the spindle drive. Readjustment of the machine for machining a workpiece, similar to the preceding one, increases the machine downtime and thus a loss in the output.

Still another disadvantage lies in that in the prior art precision multiple-spindle boring machines the guides, being arranged below the working face of the centre platen, need reliable protection and careful maintenance. This, in turn, complicates the machine design and operation and also causes downtime that reduces the output.

The principal object of the present invention is to develop a double-ended multiple-spindle horizontal-feed fine boring machine offering a higher output.

Another object of the invention is to develop a double-ended multiple-spindle horizontal-feed fine boring machine, simple in operation and attendance.

Still another object of the invention is to develop a double-ended multiple-spindle fine boring machine, wherein the shape and arrangement of the outer platens and of the centre platen ensure an easy access for the operator to the spindle heads and to the workpieces holding device.

Yet another object of the invention is to develop a double-ended multiple-spindle fine boring machine, wherein the descent of chips and cutting fluid from the working face of the centre platen by gravity would be ensured.

A further object of the invention is to develop a double-ended multiple-spindle fine boring machine suitable for machining the workpieces of the same type without resetting the tools and the device for setting up and clamping the blanks.

Still further object of the invention is to develop a double-ended multiple-spindle fine boring machine enabling a scratch-free withdrawal of the tools from the surface of machined workpieces.

SUMMARY OF THE INVENTION

The above and other objects are achieved by the subject invention, a double-ended multiple-spindle horizontal-feed fine boring machine comprising a bed with outer platens and a centre platen mounted thereon with a possibility of their relative traverse on the bearing faces of guides to effect the feed, a device for clamping the workpieces, mounted on the working face of the centre platen, spindle heads for holding the cutting tools, mounted on the outer platens in such a manner that the geometrical axes of the spindle heads are parallel to said working face, according to the invention, the working face of the centre platen is arranged in a vertical plane, the outer platens with the spindle heads mounted thereon extend vertically, the bearing faces of the guides being disposed above the centre of gravity of each one of the platens mounted thereon so as to provide a convenient loading of the workpieces and to cause the cutting fluid and chips slip down by gravity.

The arrangement of the working face of the centre platen in a vertical plane and the vertical extension of the outer platens ensure for the operator an easy access to the spindle heads and to the workpiece clamping device while operating the machine. Besides, such an arrangement of the working face enables chips and cutting fluid to slip down by gravity from the working face of the centre platen. All this simplifies the operation and maintenance of the machine and raises its output.

It is advantageous to dispose the guides on the bed on the side opposite to the working face of the centre platen. Such a machine arrangement makes it possible to employ rolled product in the form of a pipe as the supporting structure of the bearing face of the guide, which simplifies and reduces the cost of the manufacture of the machine and also allows the rigidity to be increased without increasing the weight and rolled product to be used instead of an iron casting.

It is possible to dispose the guides above the working face of the centre platen and mount them on the outer platens, while portion the centre platen may be made T-shaped with the horizontal portion serving as a bearing element contacting the bearing faces of the guides and the vertical portion having the working face and contacting a side guide serving as an additional guide of the centre platen.

It is expedient to provide the T-shaped centre platen with one more working face on the side opposite to said working face. Thus, the arrangement of the guides above the working face of the centre platen enables the latter to be furnished with two working faces. The presence of the second working face makes for a more convenient readjustment when machining workpieces of the same type and ensures higher output by using the two sides when manufacturing product of the same type.

It is further expedient to pivotally connect the horizontal portion of the centre platen to its vertical portion so as to enable the vertical portion to be swung away from the side guide under the action of a withdrawal mechanism. This makes it possible to perform a simultaneous scratch-free withdrawal of the tools from the workpieces on the machine with simplified kinematics.

It is useful to provide a mechanism connecting the vertical portion of the centre platen to its horizontal portion by means of pivots whose one ends are fixedly connected to the horizontal portion, while the other ends of the pivots are mounted in clips made at the top of the vertical portion of the centre platen. Such a construction of said mechanism enables a hinged relation between the horizontal and the vertical portion of the centre platen.

It is feasible to make in the bed, immediately below the centre platen, an open longitudinal channel and to mount therein a conveyor for the removal of chips passing thereonto by gravity. Unlike the chutes disposed at the sides of the centre platen as in prior art machines, the channel with the conveyor reduces the machine width.

BRIEF DESCRIPTION OF THE DRAWINGS

The above-mentioned and other objects and advantages of the present invention will be best understood from the detailed description of the embodiments thereof with reference to the accompanying drawings, in which the same parts are designated with the same reference numbers and in which:

FIG. 10 illustrates the machine embodiment wherein the outer platens are mounted on the guides with a possibility of their traverse;

FIG. 11 is a view along the line XI—XI in FIG. 10, showing an outer platen mounted on the guides and connected to its drive cylinder; and FIG. 12 is a view along the line XII—XII in FIG. 10, illustrating the centre platen fixedly mounted on the bed.

DETAILED DESCRIPTION OF EMBODIMENTS OF THE INVENTION

Figure 1:
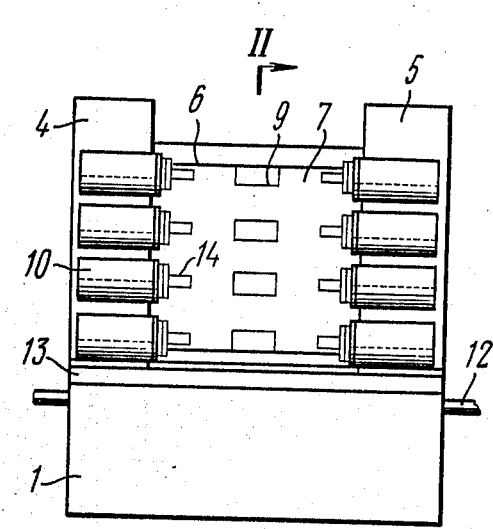
FIG. 1 is a diagrammatic general view of the double-ended multiple-spindle fine boring machine whose guides are disposed on the opposite side with respect to the working face of the centre platen.

A double-ended multiple-spindle horizontal-feed fine boring machine comprises a bed 1 (FIGS. 1 and 2) with guides 2 having a bearing face 3.

The bed 1 carries outer platens 4, 5 and a centre platen 6, the outer platens 4 and 5 being fixedly mounted on the bed 1, whereas the centre platen 6 is movably mounted on the guides 2. The centre platen 6 has a vertically extending working face 7 and is mounted on the guides 2 in such a manner that its centre of gravity C is located below the bearing face 3 of the guides 2. The guides 2 are disposed on the opposite side with respect to the working face 7 of the centre platen 6.

A multiple-position device 8 for clamping workpieces 9 is mounted on the working face 7. The centre platen 6 is connected to a drive made in the form of a hydraulic cylinder (not shown) for reciprocating the centre platen in a horizontal direction.

The outer platens 4 and 5 extend vertically and carry spindle heads 10 mounted thereon, whose geometrical axis are parallel to the working face 7 of the centre platen 6. The spindle heads 10 are intended for holding the cutting tools therein.

In the bed 1 there is provided an open channel 11 disposed immediately below the centre platen 6. Mounted in the channel 11 is a conveyor 12. A pan 13 for receiving chips passing thereafter onto the conveyor 12 is arranged under the spindle heads 10.

For a better illustration of the double-ended multiple-spindle fine boring machine according to the present invention, its operation is shown in a semiautomatic mode, the means providing for the mode not being described in order to avoid misunderstanding.

The herein disclosed double-ended multiple-spindle fine boring machine operates as follows.

The workpieces 9 to be machined from both ends are clamped in the multiple-position device 8 (FIG. 1). The centre platen 6 is rapidly moved on the guides 2 (FIG. 2) by the hydraulic cylinder (not shown) to one of the outer platens, for instance, to the outer platen 4. As the workpieces 9 reach cutting tools 14, a command is delivered for engagement of the working feed and for rotation of the cutting tools 14 of the spindle heads 10 to machine one end of each of the workpieces 9. On completion of the machining, a command is given for the reverse, i.e., for withdrawing the centre platen 6 from the outer platen 4 and advancing the centre platen 6 to the outer platen 5. Machining the opposite end of the workpieces is done in a manner similar to that described above. On completion of the machining of the workpieces 9, the centre platen 6 is withdrawn to the loading position.

Cutting fluid supplied in abundance into the cutting zone washes off the chips which slip down by gravity into the pan 13 and pass onto the conveyor 12, which discharges the chips outside of the machine.

Figure 3:
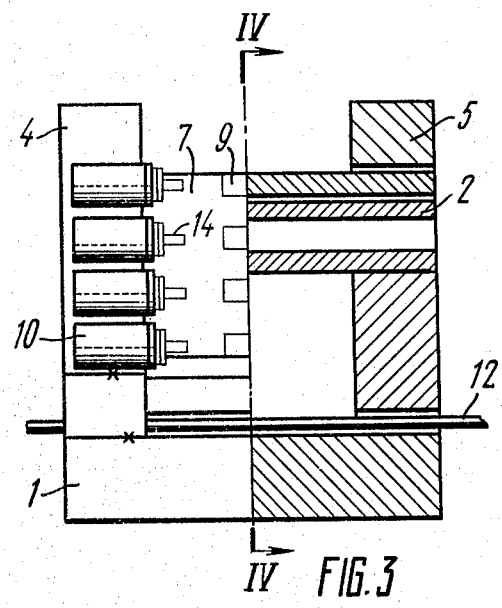
FIG. 3 is a schematic illustration, with a partial longitudinal section of the machine embodiment, wherein the guide of the centre platen is made in the form of a tube.
Figure 4:
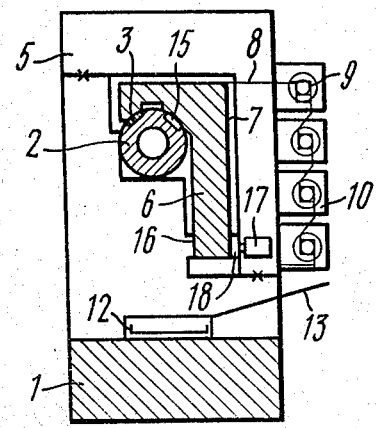
FIG. 4 is a view along the line IV—IV in FIG. 3, illustrating the centre platen mounted on the guide in the form of a tube.
Figure 5:
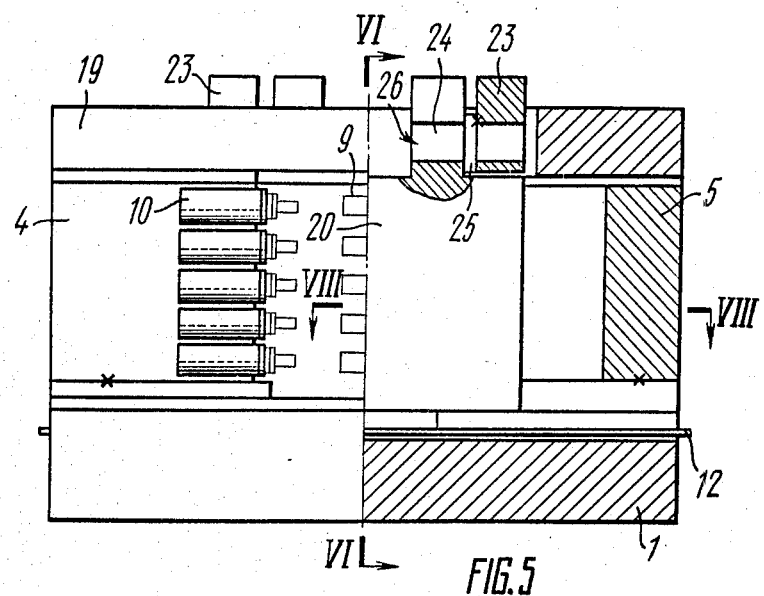
FIG. 5 is a schematic illustration, with a partial longitudinal section, of the machine embodiment wherein the guides are arranged above the working face of the centre platen which is made T-shaped.

In an embodiment of the machine (FIGS. 3 and 4), the guide 2 of the centre platen 6 is made in the form of a tube disposed on the opposite side with respect to the working face of the centre platen 6. Strips 15 with the bearing faces 3 formed thereon are attached to the top portion of the guide 2 (FIG. 4). A side guide 16 is provided on the bed 1. The centre platen 6 is made L-shaped with its horizontal portion disposed on the bearing faces 3, while the vertical portion contacts the side guide 16. To ensure a reliable contact of the vertical portion of the centre platen 6 with the side guide 16, the vertical portion is constantly pressed against the side guide by a mechanism 17. The mechanism 17 represents a hydraulic cylinder whose rod carries a plate 18 made of a material with a low friction coefficient.

Figure 2:
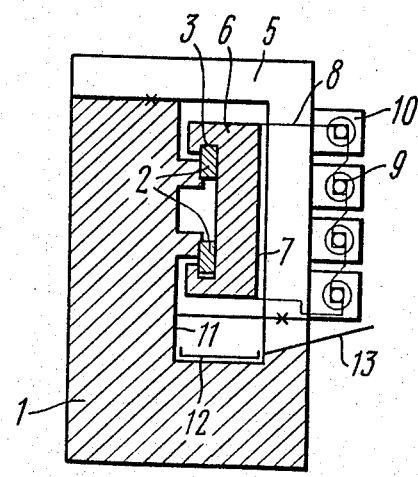
FIG. 2 is a view along the line II—II in FIG. 1, showing the centre platen mounted on the bed guides.

The above-described embodiment of the machine operates in a manner similar to the embodiment shown in FIGS. 1 and 2.

In another embodiment of the machine (FIGS. 5 and 6, 7 and 8), the guides are arranged above the working face 7 of the centre platen 6 (FIG. 6) and mounted on the outer platens 4 and 5. The centre platen 6 is of a T-shape with the horizontal portion 19 made in the form of a plate laid onto the bearing faces 3 of the guides 2. The vertical portion 20 of the centre platen 6 has one more working face 7', i.e., the working faces 7 are disposed on both sides of the vertical portion.

The bed 1 is provided with a side guide 16 contacted by the bottom of the vertical portion 20 of the centre platen 6. For a reliable contact of the vertical portion 20 with the side guide 16, the vertical portion is pressed against the side guide by a mechanism 17. A withdrawal mechanism 21 in the form of a hydraulic cylinder is mounted on the bed 1, on the opposite side with respect to the mechanism 17, for swinging the vertical portion 20 away from the side guide 16.

Figure 6:
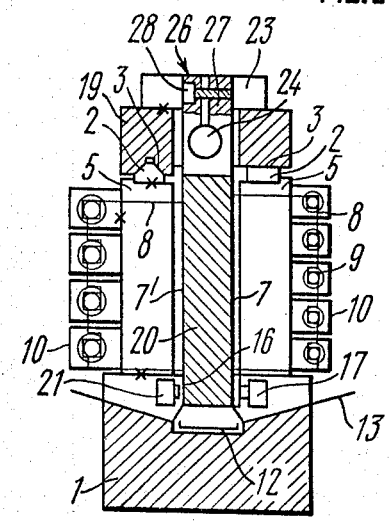
FIG. 6 is a view along the line VI—VI in FIG. 5, representing the T-shaped centre platen provided with one more working faces.
Figure 7:
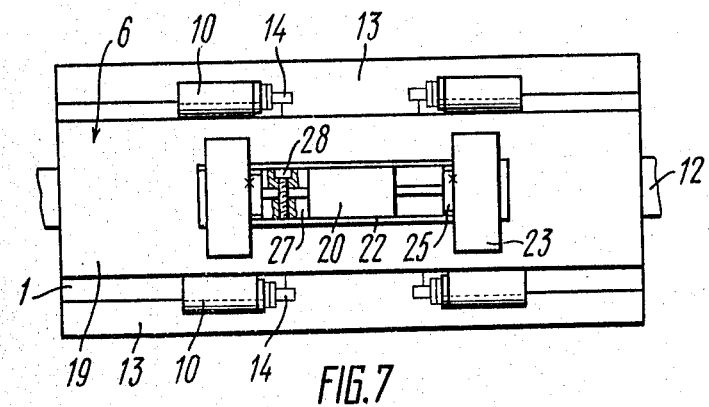
FIG. 7 is a plan view of FIG. 5 showing the horizontal portion of the centre platen, made in the form of a plate, wherefrom the vertical portion of the centre platen is suspended by means of pivots.

The horizontal portion 19 has a port 22 and carries fixed brackets 23 having apertures to receive pivots 24 with flanges 25 intended for a rigid attachment of the pivots 24 to the brackets 23 (FIGS. 6 and 7).

The vertical portion 20 of the centre platen 6 has at its top a device 26 for enabling the vertical portion to be swung away from the side guide 16. The device 26 represents a hinge comprising clips 27 which embrace the pivots 24 and are secured by screws or bolts 28. The clips 27 are fixedly attached to the vertical portion 20.

Figure 8:
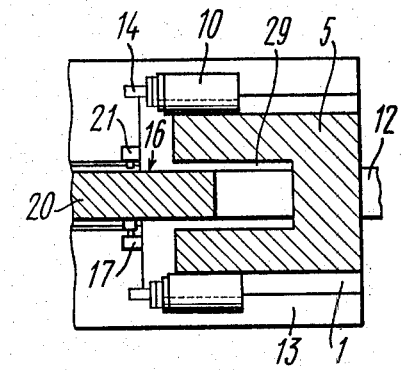
FIG. 8 is a view along the line VIII—VIII in FIG. 5, representing the outer platen made U-shaped.

The outer platens 4 and 5 are U-shaped in plan (FIG. 8). The outer walls of the platens carry spindle heads 10, while the inner spaces 29 are intended for accommodating the vertical portion 20 of the centre platen 6 in its extreme positions.

The horizontal portion 19 is connected with the drive of the centre platen 6, made in the form of a hydraulic cylinder (not shown).

The above-described embodiment of the machine operates as follows.

When machining workpieces of the same type, the workpieces 9 are clamped in the devices 8 mounted on both working faces 7 and 7'.

The centre platen 6, moving on guides 2, is rapidly advanced to one of the outer platens 4 or 5 under the action of the hydraulic cylinder (not shown). On reaching the outer platen 4, a command is given for engagement of the working feed and for rotation of cutting tools 14 fitted in the spindle heads 10 to effect a simultaneous machining of the workpieces 9 located on both sides of the centre platen 6.

Figure 9:
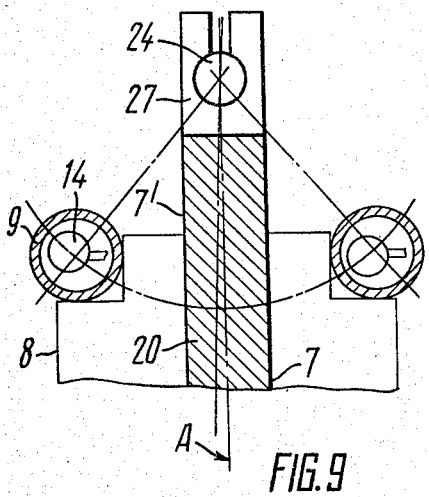
FIG. 9 illustrates the position of the cutting tools with respect to the machined surface of the workpieces when the vertical portion of the centre platen is swung in the direction of arrow A.

As the machining is completed, a command is delivered for stopping the spindles of the heads 10 and setting the cutting tools 14 in an angular position (FIG. 9) which ensures formation of gaps between the points of the cutting tools 14 and the machined surfaces of the workpieces 9 after the vertical portion 20 has been swung away from the side guide 16 by the withdrawal mechanism 21. With the vertical portion 20 in this position, a command is delivered for reversing the centre platen 6 and advancing it to the outer platen 5. During the traverse of the centre platen 6, a scratch-free extraction of the cutting tools 14 is accomplished owing to the gaps formed between the tools and the machined surfaces of the workpieces. After the cutting tools 14 have been withdrawn from the machined workpieces 9, a command is given for pressing the vertical portion 20 against the side guide 16. Machining the opposite ends of the workpieces 9 is done in a similar way.

In a still another embodiment of the invention (FIGS. 10, 11, and 12), the outer platens 4 and 5 are movably mounted in guides 2 (FIG. 11), while the centre platen 6 (FIG. 12) is fixedly installed on the bed 1. The device 8 for clamping the workpieces 9 is mounted on the working face 7 of the centre platen 6. The outer platens 4 and 5 carry spindle heads 10 and are connected with hydraulic cylinders 30 for effecting a reversing travel of the outer platens in a horizontal direction with respect to the centre platen 6. The outer platens 4 and 5 are mounted in the guides 2 in such a manner that the centres of gravity C of the outer platens are located below the working faces 3 of the guides 2.

The above-described embodiment of the machine operates as follows.

The workpieces to be machined from both ends are clamped in the device 8 (FIG. 7).

In accordance with the semiautomatic mode of the machine operation, a command is delivered to hydraulic cylinders 30 for a simultaneous and rapid advance of the outer platens 4 and 5 to the centre platen 6. After the cutting tools 14 of the spindle heads 10 of both outer platens 4 and 5 placed on the centre platen 6 have reached the workpieces 9, a command is given for engagement of the working feed and for rotation of the spindle heads 10 to effect machining of both ends of the workpieces simultaneously. On completion of the machining, a command is given to withdraw the outer platens 4 and 5 from the centre platen 6.

It is expedient to employ the above-described embodiment of the double-ended multiple-spindle horizontal-feed fine boring machine when a sharp increase in the output is required. Besides, it serves as an example confirming that the reverse travel of the platens in accordance with the invention can be accomplished in two ways, viz.: either the centre platen 6 is movably mounted on the guides 2 for horizontal relative movement with respect to the outer platens 4 and 5 (FIGS. 1, 3, and 5) fixedly mounted on the bed 1, or the outer platens 4 and 5 (FIG. 10) are mounted on the guides 2 for horizontal movement with respect to the centre platen 6 fixedly mounted on the bed 1.

While particular embodiments of the invention have been shown and described, various modifications thereof will be apparent to those skilled in the art, and therefore it is not intended that the invention be limited to the disclosed embodiments or to the details thereof and the departures may be made therefrom within the spirit and scope of the invention as defined in the claims.

What is claimed is:

1. A double-ended multiple-spindle horizontal-feed fine boring machine comprising:
   a bed having at least one guide with bearing faces thereon;
   outer platens extending vertically;
   a centre platen having a working face arranged in a vertical plane;
   spindle heads mounted in a vertical row on said outer platens and serving for holding cutting tools therein, said spindle heads being arranged in such a manner that their axes are parallel to said working face of said centre platen;
   a device for clamping workpieces, mounted on the working face of said centre platen;
   said outer platens and said centre platen mounted on said bearing faces of said at least one guide, said centre platen being capable of horizontal movement between said outer platens and to effect the feed, each one of said bearing faces being disposed above the centre of gravity of each one of said platens mounted thereon.

2. A machine according to claim 1, wherein said centre platen contacts said at least one guide of said bed with the side opposite to its working face.

3. A machine according to claim 1, wherein said guides are arranged above said working face of said centre platen and mounted on said outer platens, said centre platen having a T-shape with a horizontal portion and a vertical portion, said horizontal portion of said centre platen being in contact with said bearing faces of said guides, said centre platen having said working face on a first side of said vertical portion; the bed incorporating a side guide which contacts a bottom end of said vertical portion of said centre platen.

4. A machine according to claim 3, wherein said centre platen has a second working face arranged on the side of said vertical portion opposite to said first side.

5. A machine according to claim 4, wherein said horizontal portion is connected to said vertical portion of said centre platen by a means to enable said vertical portion to swing with respect to said horizontal portion in order to provide for withdrawal of the cutting tools from the machined surface of the workpieces.

6. A machine according to claim 5, wherein said swinging means comprises at least one pivot and at least one clip arranged at the top of said vertical portion; one end of said at least one pivot being fixedly connected to said horizontal portion, while the other end of said at least one pivot being rotatably mounted in said at least one clip, which is attached to said vertical portion.

7. A machine according to claim 1, wherein a longitudinal open channel is provided in said bed immediately below said centre platen; a conveyor for the removal of the chips passing thereonto by gravity mounted in said longitudinal open channel, and a downwardly sloping longitudinal pan positioned below said spindle heads, the lower end of said pan disposed above said conveyor.

8. A machine according to claim 1, wherein said at least one guide comprises two guides.

9. A machine according to claim 1, wherein said at least one guide comprises a tube and said bearing faces comprise strips attached to the surface of the top portion of said tube.

* * * * *